(12) United States Patent
Conrad

(10) Patent No.: US 8,590,102 B2
(45) Date of Patent: Nov. 26, 2013

(54) FILTRATION CHAMBER CONSTRUCTION FOR A CYCLONIC SURFACE CLEANING APPARATUS

(75) Inventor: Wayne Ernest Conrad, Hampton (CA)

(73) Assignee: G.B.D. Corp., Nassau (BM)

(*) Notice: Subject to any disclaimer, the term of this patent is extended or adjusted under 35 U.S.C. 154(b) by 918 days.

(21) Appl. No.: 12/675,558

(22) PCT Filed: Aug. 28, 2008

(86) PCT No.: PCT/CA2008/001535
§ 371 (c)(1),
(2), (4) Date: Feb. 26, 2010

(87) PCT Pub. No.: WO2009/026714
PCT Pub. Date: Mar. 5, 2009

(65) Prior Publication Data
US 2010/0212104 A1 Aug. 26, 2010

(30) Foreign Application Priority Data
Aug. 29, 2007 (CA) .................................. 2599303

(51) Int. Cl.
*A47L 9/10* (2006.01)
(52) U.S. Cl.
USPC ................................. 15/353; 15/345; 15/347
(58) Field of Classification Search
USPC .......................................... 15/345, 347, 353
See application file for complete search history.

(56) References Cited

U.S. PATENT DOCUMENTS

| 3,320,727 A * | 5/1967 | Farley et al. ............... 55/337 |
| 3,582,616 A | 6/1971 | Wrob |
| 4,373,228 A | 2/1983 | Dyson |
| 4,826,515 A | 5/1989 | Dyson |
| 5,230,722 A * | 7/1993 | Yonkers ...................... 55/337 |
| 5,309,601 A | 5/1994 | Hampton et al. |
| 5,858,038 A | 1/1999 | Dyson et al. |
| 6,210,469 B1 * | 4/2001 | Tokar ......................... 95/287 |
| 6,221,134 B1 | 4/2001 | Conrad et al. |
| 6,553,612 B1 | 4/2003 | Dyson et al. |
| 6,560,818 B1 | 5/2003 | Hasko |
| 6,581,239 B1 | 6/2003 | Dyson et al. |
| 6,782,585 B1 | 8/2004 | Conrad et al. |
| 7,222,393 B2 | 5/2007 | Kaffenberger et al. |
| 7,386,916 B2 * | 6/2008 | Bone ........................... 15/344 |
| 7,485,164 B2 * | 2/2009 | Jeong et al. ................. 55/337 |

FOREIGN PATENT DOCUMENTS

| DE | 3734355 | * 4/1998 | ............ A47L 9/20 |
| GB | 2163703 | 3/1986 | |
| JP | 2000140533 A | 5/2000 | |
| WO | 00/78546 A1 | 12/2000 | |

* cited by examiner

*Primary Examiner* — Lee D Wilson
*Assistant Examiner* — Shantese McDonald
(74) *Attorney, Agent, or Firm* — Philip C. Mendes da Costa; Bereskin & Parr LLP/ S.E.N.C.R.L., s.r.l.

(57) ABSTRACT

A surface cleaning apparatus comprises a filtration apparatus comprising at least one cyclone and at least one filter mounted in a filter housing. The filter housing has a lower portion, such as a bottom door, that is openable and the filter is visible, and a dirt collection area upstream of the filter is emptyable, when the lower portion is opened.

19 Claims, 6 Drawing Sheets

FILTRATION CHAMBER CONSTRUCTION FOR A CYCLONIC SURFACE CLEANING APPARATUS

FIELD

This application relates to surface cleaning apparatus, such as vacuum cleaners.

BACKGROUND

The use of a cyclone, or multiple cyclones connected in parallel or series, is known to be advantageous in the separation of particulate matter from a fluid stream. Currently, many vacuum cleaners, which are sold for residential applications, utilize at least one cyclone as part of the air filtration mechanism.

U.S. Pat. No. 4,826,515 (Dyson) discloses a cyclonic vacuum cleaner having two cyclonic stages, namely a first stage for separating larger particulate matter from an air stream and a second stage for separating finer particulate matter from the same air stream. Each cyclonic stage comprised a single cyclone wherein separated particulate matter was collected in the bottom of the cyclones. Vacuum cleaners, which use a cyclonic cleaning stage comprising a plurality of cyclones in parallel, are also known.

Typically, vacuum cleaners also have one or more filters positioned downstream from the cyclone or cyclones and upstream from the suction motor. In addition, a filter, such as a HEPA filter, may be positioned downstream of the suction motor.

SUMMARY

In accordance with this invention, a surface cleaning apparatus comprises a filtration apparatus having a cyclone. The cyclone has an air inlet and an air outlet. A filter, such as a foam filter, is positioned downstream of the cyclone chamber in a filter housing. Accordingly, after the air exits the cyclone chamber, the air passes through the filter. The filter may be accessed for cleaning or replacement by a lower openable portion, such as a bottom openable door.

The cyclone air exit (e.g., a vortex finder) may have a screen or shroud provided in an overlying relationship to the air exit. Accordingly, the air will travel trough the screen or shroud as it exits the cyclone chamber. Alternately, as disclosed in a co-pending application, the screen may be positioned downstream from the cyclone air exit, e.g., in a filtration chamber. Optionally, in a preferred embodiment, a screen or shroud is not provided in the cyclone chamber. In any event, some larger particulate matter may exit the cyclone chamber and travel downstream to the filter, which may be a foam or felt filter. The larger particulate matter will be captured by the filter and may build up on the upstream surface of the filter. From time to time, the filter may require cleaning or replacement. The filter may accordingly be positioned in a filter housing and the filter housing may have a lower openable portion. Accordingly, when the filter housing is opened, dirt that has accumulated on the upstream face of the filter may fall off. If the filter is opened over a garbage can or the like, then the dirt may be directly deposited in the garbage without a consumer having to touch the filter. This may be particularly advantageous if a mechanical cleaning member is provided and is operable when the filter housing is opened.

In a particularly preferred embodiment, a cyclone chamber has no interior screen, shroud or filter covering the cyclone air outlet. Accordingly, no member requiring cleaning is positioned inside the cyclone chamber or surrounding the cyclone outlet (e.g. surrounding the vortex finder) and accordingly the cyclone outlet, e.g., the inlet to a vortex finder, is unobstructed.

A screen having a surface area that is 2 times, preferably at least about 5 times, more preferably at least about 10 times and, most preferably at least about 20 times, e.g. 20-50 times, the cross sectional area of the cyclone air outlet may be positioned downstream from the cyclone air exit and upstream from the filter. It will be appreciated that the screen may be flat or may be curved, e.g., bowl shaped. The use of such a large screen enhances the time during which the vacuum surface cleaning apparatus may be used without having to clean or replace the screen. Further, by positioning the screen exterior to the cyclone chamber, a large screen may be provided without reducing the size of the cyclone chamber. For example, the screen may be positioned in a separate filtration chamber downstream from the cyclone chamber. In such a case, preferably at least a portion of the filtration chamber may be transparent. For example, the filtration chamber may have an access door that is at least partially, and preferably all of the access door is, transparent.

In accordance with another aspect of the invention, there is provided a surface cleaning apparatus comprising:
  (a) a dirty air inlet;
  (b) a filtration apparatus comprising at least one cyclone and at least one filter mounted in a filter housing;
  (c) the filter housing having a lower portion that is openable and the filter is visible when the lower portion is opened;
  (d) a suction motor; and,
  (e) a clean air outlet downstream from the suction motor.

In any embodiment, the filter housing may be openable while the filter housing is mounted to the filtration apparatus.

In any embodiment, the surface cleaning may further comprise an openable cyclone dirt collection chamber and the filter housing may be openable independently of the cyclone dirt collection chamber. Alternately, the filter housing may be openable concurrently with the cyclone dirt collection chamber.

In any embodiment, the filter housing may be mounted to the at least one cyclone.

In any embodiment, the filter housing may be removably mounted to the filtration apparatus, such as the at least one cyclone, by any means known in the art such as a snap fit, a screw fit, a bayonet mount, a quick release mechanism or the like.

In any embodiment, the filter housing may be positioned below the cyclone. For example, the filter housing may be mounted on the lower surface of the cyclone. In such an embodiment, the cyclone may have an openable bottom, as is known in the art. The filter housing may have a separate openable bottom. Accordingly, the cyclone (e.g., a dirt collection chamber in the bottom of the cyclone) may be emptied when the openable bottom of the cyclone is opened and the filter housing may be emptied when the openable bottom of the filter housing is opened.

Alternately, the filter housing is positioned adjacent the cyclone. For example, the filter housing may be mounted beside the cyclone. In such an embodiment, the cyclone may have an openable bottom, as is known in the art. The filter housing may have a separate openable bottom. Alternately, the openable bottom of the filter housing may be an extension of the openable bottom of the cyclone. Accordingly, the cyclone (e.g., a dirt collection chamber in the bottom of the cyclone) may be emptied when the openable bottom of the cyclone is opened and the filter housing may be emptied when the openable bottom of the filter housing is opened.

For example, the surface cleaning apparatus may comprise first and second housings positioned side by side, the first housing comprising the at least one cyclone and the second housing comprising the filter housing.

In accordance with such an embodiment, the first housing may have a first housing bottom that is openable and the openable lower portion comprises the bottom of the second housing, and the first housing bottom is connected to the second housing bottom, whereby both the first housing bottom and the second housing bottom are moveable concurrently.

In accordance with such an embodiment, the first housing may further comprise a dirt collection chamber positioned around at least a portion of the cyclone, the dirt collection chamber may have a moveable dirt collection chamber floor, the cyclone may have a lower moveable cyclone floor, whereby both the dirt collection chamber and the cyclone are concurrently emptied when the first housing bottom and the second housing bottom are opened concurrently.

In accordance with such an embodiment, the first housing may have a first housing bottom and the second housing may have a second housing bottom and the first housing bottom and the second housing bottom may form part of an airflow passage from a cyclone outlet to an upstream side of the filter. Preferably, at least a portion of the passage is transparent and, more preferably, the passage is transparent.

In any embodiment, the surface cleaning apparatus may further comprise a dirt collection chamber positioned around at least a portion of the cyclone and the cyclone floor includes a vortex finder mounted thereto.

In some embodiments, the cyclone is openable and the filter housing is openable concurrently with the cyclone.

In any embodiment, the filter may have an upstream filter surface that faces the openable lower portion and is spaced therefrom, whereby a dirt collection area is provided between the upstream filter surface and the openable lower portion.

In any embodiment the surface cleaning apparatus may further comprise a mechanical filter-cleaning member. The mechanical filter-cleaning member may comprise a vibrator connected to the filter. Alternately, or in addition, the mechanical filter-cleaning member may comprise a wiper positioned on an upstream side of the filter. The vibrator or wiper may be actuated when the filtration chamber, e.g., a second housing bottom, is opened. The mechanical filter-cleaning member may be battery powered.

In any embodiment, the cyclone may be inverted. However, it will be appreciated that the cyclone may be of any configuration or orientation. Further, the surface cleaning apparatus may include a cyclonic stage comprising a single cyclone or a plurality of cyclones, or a plurality of cyclonic stages that are used in series. If a plurality of cyclonic stages are provided, then it is preferred that the filter housing is positioned downstream of the last cyclonic stage and upstream of the suction motor.

It will be appreciated that the filter housing may be removably mounted to the filtration apparatus. Accordingly, the filter housing may be removed and then opened. For example, once the filter housing is removed from the filtration apparatus, the filter housing may then be opened, e.g., by pivoting a lower wall, e.g., the lower surface, of the filter housing.

Preferably, the filter housing is mounted to the cyclone. For example, it may be mounted to the cyclone casing that houses the cyclone or any of the cyclonic stages.

It will be appreciated that the cyclone may be emptied when mounted to the surface cleaning apparatus. Accordingly, the filter housing may be emptied when still affixed to the surface cleaning apparatus. Alternately, if the filter housing is removably mounted to the filtration apparatus, it may be removed from the surface cleaning apparatus for emptying.

It will also be appreciated that the cyclone (e.g., the filtration apparatus) may be removed from the surface cleaning apparatus for emptying. In such a case, the filter housing is preferably removable with the filtration apparatus, i.e. mounted or removably mounted to the filtration apparatus. It will also be appreciated that the filter housing may remain on the surface cleaning apparatus when the cyclone is removed for emptying.

It will also be appreciated that in any embodiment, additional screens and/or filtration members may be used.

It will be appreciated by those skilled in the art that any of the embodiments may be used individually or in a single surface cleaning apparatus, as exemplified in a preferred embodiment described herein, or in any particular sub-combination. Accordingly, any two or more embodiments may be used in a single surface cleaning apparatus. In addition, any of the optional features described herein may be used in combination with any alternate embodiment or sub-combination or combination of alternate embodiments.

BRIEF DESCRIPTION OF THE DRAWINGS

These and other advantages of the instant invention will be more fully and completely understood in conjunction with the following description of the preferred embodiments of the invention in which.

DETAILED DESCRIPTION

Figure 1:
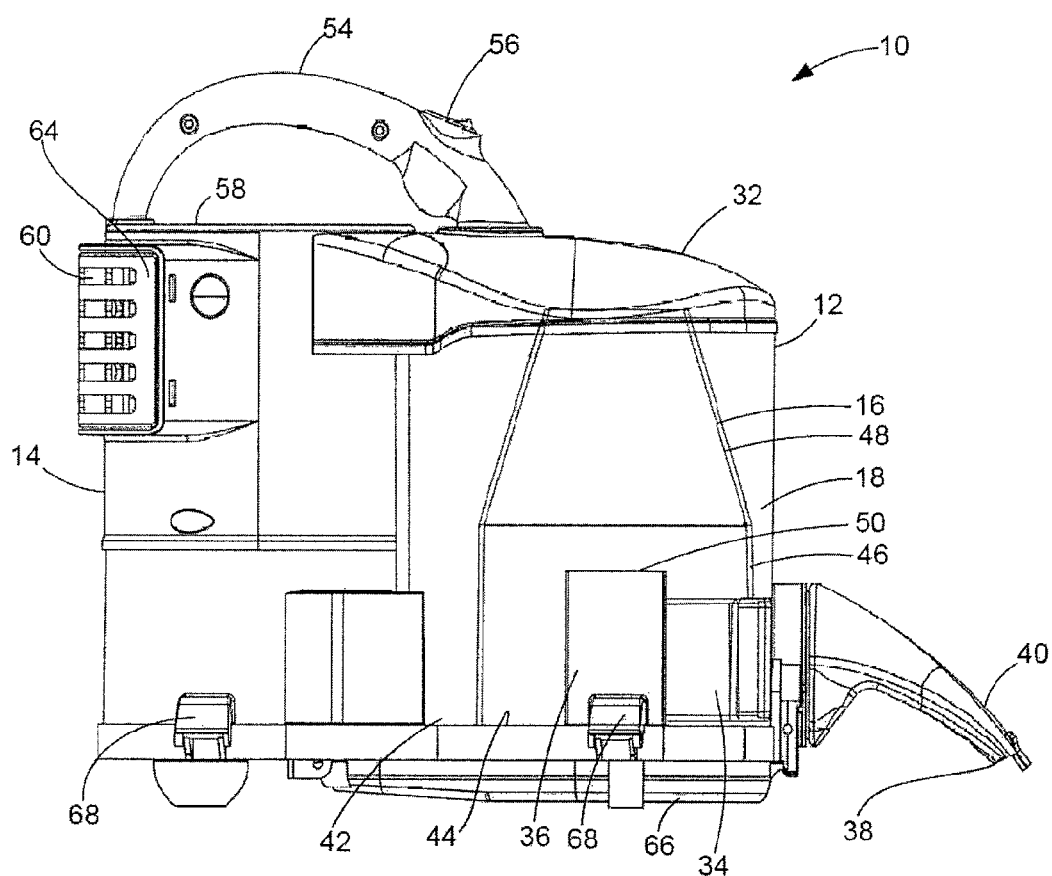
FIG. 1 is a side elevational view of a preferred embodiment of a vacuum cleaner in accordance with this design wherein the outer casing surrounding the cyclone and forming an outer wall of a dirt collection chamber is optionally transparent.
Figure 2:
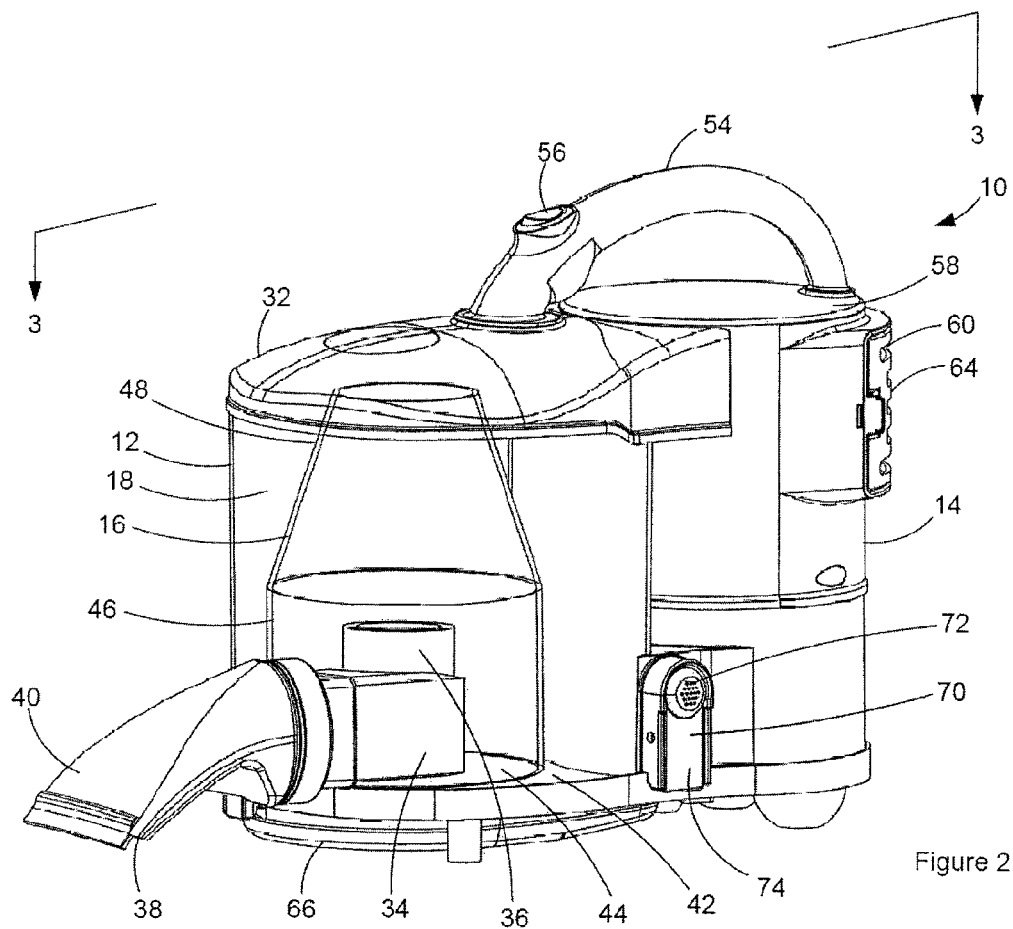
FIG. 2 is a perspective view from the front and the right side of the vacuum cleaner of FIG. 1.

As shown in FIGS. 1-6, a surface cleaning apparatus comprises a vacuum cleaner 10 having a filtration apparatus having at least one cyclone and a filter downstream of the cyclone chamber. The filtration apparatus may be of any design or configuration. As exemplified, surface cleaning apparatus 10 has a first housing 12 and a second housing 14. First housing 12 comprises at least one cyclone 16 and a dirt collection chamber 18 and second housing 14 houses the filtration members and the suction motor. In an alternate embodiment, it will be appreciated that surface cleaning apparatus 10 may have a first cyclonic cleaning stage comprising a single cyclone having a dirt collection chamber and a second cyclonic cleaning stage comprising a plurality of second stage cyclones in parallel.

It will be appreciated that, surface cleaning apparatus may be a vacuum cleaner, a carpet extractor, a bare floor cleaner or the like. As exemplified, the surface cleaning apparatus is hand held. However the surface cleaning apparatus may be configured as an upright vacuum cleaner, a stick vacuum cleaner, a canister vacuum cleaner, a backpack or shoulder strap vacuum cleaner or other configuration known in the art.

The surface cleaning apparatus may have a single cyclonic cleaning stage, which may be of any construction known in the art, or a plurality of cyclonic cleaning stages, each of which may be of any construction known in the art, e.g. they may comprise a single cyclone or a plurality of cyclones in parallel.

Figure 3:
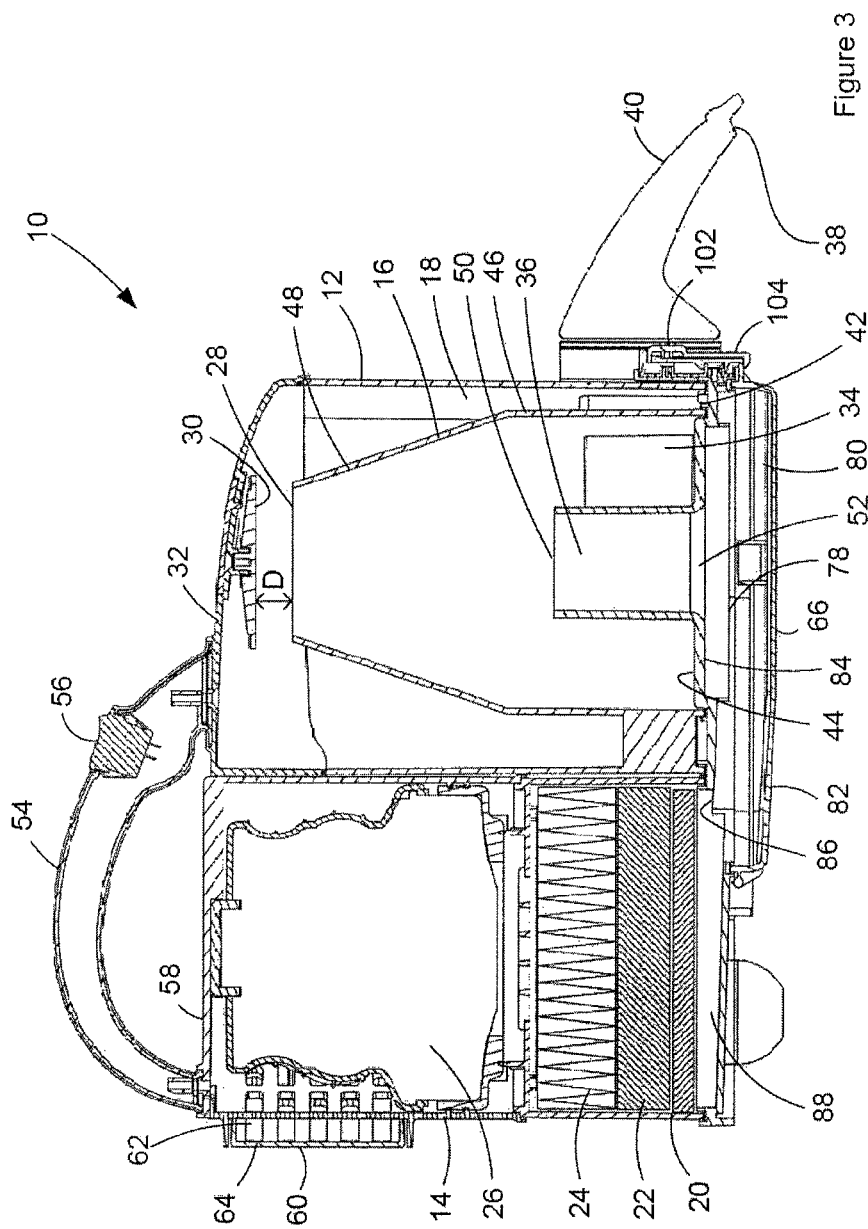
FIG. 3 is a cross-section along the line 3-3 in FIG. 2.
Figure 4:
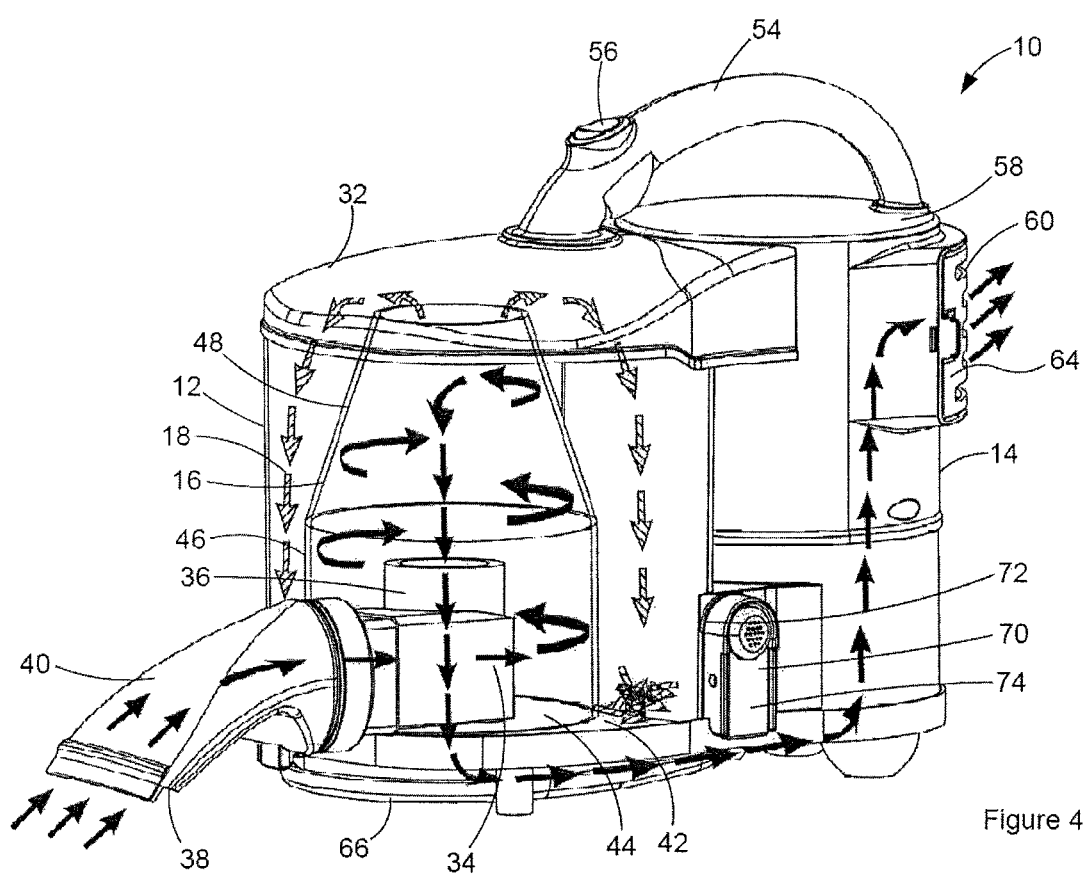
FIG. 4 is a schematic drawing of the vacuum cleaner of FIG. 1 showing the airflow passage therethrough.

The following description is based on FIGS. 1-6, which exemplifies the invention in accordance with the use of an inverted cyclone with side by side housings. As exemplified in FIG. 3, cyclone 16 has a lower air inlet 34 and a lower air outlet 36. Air inlet 34 is positioned downstream from dirty air inlet 38 of surface cleaning nozzle 40. Surface cleaning nozzle 40 may be any surface cleaning nozzle known in the art. Air inlet 34 of cyclone 16 may be in airflow communication with surface cleaning nozzle 40 in any manner known in the art. The exact structure of surface cleaning nozzle 40 and the communication passage between surface cleaning nozzle 40 and air inlet 34 will vary depending if the surface cleaning apparatus is an upright vacuum cleaner, canister vacuum cleaner or, as exemplified, a portable hand held vacuum cleaner. In operation, air will enter cyclone 16 through inlet 34 and travel upwardly, as exemplified in FIG. 4. The air will then travel downwardly to exit cyclone 16 via outlet 34. As shown in FIG. 4 by the hatched arrows, dirt will exit upwardly through outlet 28 and deposit on dirt collection chamber floor 42. In addition, some of the heavier particulate matter may not be entrained in the air stream and may be deposited on cyclone floor 34.

In an alternate embodiment, it will be appreciated that cyclone 16 need not be inverted but may be of any configuration or orientation. Cyclone 16 may be any cyclone casing having a separator plate to divide the cyclone casing into an upper cyclone chamber positioned above the separator plate and a lower dirt collection chamber positioned below the separator plate. Alternately, the cyclone may be provided with a dirt outlet 28 and may be provided with an impingement member 30 or members positioned spaced a distance D from the dirt outlet. The cyclone may be an upright cyclone or a cyclone having a single direction of travel of the air.

As exemplified, cyclone 16 is a frustoconical cyclone having cylindrical portion 46 and frustoconical portion 48. Alternately, or in addition to the orientation of cyclone 16, it will be appreciated that cyclone 16 may be cylindrical, entirely frustoconical or any other shape known in the art.

As exemplified in FIG. 3, outlet 36 of cyclone 16 comprises a vortex finder that extends inwardly into the cyclone chamber defined by cyclone 16. Outlet 36 preferably comprises a generally cylindrical passage having an inlet 50 and an outlet 52. It will be appreciated that, in an alternate embodiment any outlet or vortex finder known in the art for cyclones may be utilized.

In some embodiments, inlet 50 may be covered by a screen, shroud or filter as in known in the art. However, it is preferred that vortex finder 36 is unobstructed, i.e., no screen, shroud (e.g. a perforated or apertured plastic cover) or filter is provided on inlet 50. Accordingly, as exemplified in FIG. 3, vortex finder 36 is not surrounded by a screen, shroud or filter and no physical separation member is positioned in the cyclone chamber of cyclone 16. Accordingly, no filtration or screen member interior of cyclone 16 requires cleaning. Elongate material such as hair or fibre can become adhered to a shroud, requiring the shroud to be manually cleaned. If the shroud is inside the cyclone chamber, then the chamber should be openable sufficiently to permit a user to insert their hand to clean the shroud, or to remove the shroud for cleaning. Accordingly, it will be appreciated that bottom 44 need not be openable to permit a screen or a shroud or filter associated with inlet end 50 of outlet 36 to be cleaned. Preferably, a screen is positioned downstream from cyclone 16 and upstream from the pre-motor filters. For example, a screen 78 is preferably provided. The material that would otherwise clog a screen or shroud that surrounds inlet 50 may be retained by optional screen 78 which may be larger than a screen in a cyclone chamber.

As exemplified, filtration chamber 80 is provided adjacent outlet 36 and, preferably, screen 78 is in sealing engagement with outlet 52. It will be appreciated that screen 78 is preferably mounted in filtration chamber 80 such that the air exiting cyclone 16 is forced to pass through screen 78 as the air travel downstream of filtration chamber 80 (e.g., to a second cyclonic cleaning stage or foam filter 80). Referring to FIG. 3, screen 78 is positioned on adjacent rear surface 84 of floor 44 and overlies outlet 52. Accordingly, air that exits outlet 36 travels through screen 78. The air then travels through filtration chamber 80 and travels laterally to outlet 86, and to second housing 14.

In accordance with a preferred embodiment of this invention, a series filtration members are used in series downstream from cyclone 16 and, preferably, downstream from optional screen 78. In accordance with this preferred embodiment, the filtration members comprise a foam filter 22 downstream from screen 78, a felt filter 22 downstream from foam filter 20 and a HEPA filter 24 downstream from felt filter 22. Preferably, all of these filters are positioned upstream from suction motor 26. Alternately, one or more of these filters may be positioned downstream from suction motor 26. In particular HEPA filter 24 may be downstream from suction motor 26. Accordingly, a plurality of screening and filtration members, each of which have a finer filtration capacity (e.g. smaller pores) are provided in series in the downstream direction.

Accordingly at least one filter, and in this embodiment a series of filters, are provided in a filter housing, in this embodiment the bottom of second housing 14. It will be appreciated that, if a single filter is used, the filter may be any filter known in the art. This filter housing has a lower openable portion, e.g. pivoting bottom 66. If will be appreciated that any lower portion of the filter housing may be opened and may be opened by any means known in the art. For example, the lower portion may comprise part of the lower surface or may include a portion of the sidewalls of the filter housing. The openable portion is preferably retained on the surface cleaning apparatus when opened, e.g., by a pivotal mount, a slidable mount, a translatable mount or the like. Alternately, it may be removed when opened, such as a screw or bayonet mount or a snap fit.

Preferably headspace 88 is provided below filter 20. Headspace 88 comprises a dirt collection area positioned between the upstream surface of foam filter 20 and the inner surface of pivoting bottom 66 that faces filter 20. Accordingly, when the lower openable portion, e.g. pivoting bottom 66, is opened, then the filter is visible (e.g., the upstream face of filter 20 is visible from below). Further, any dirt collected in headspace 88 will fall out, preferably into a garbage can over which surface cleaning apparatus 10 may then be positioned.

In this embodiment, the housing for filter 20 is mounted to filtration apparatus 10 and is adjacent cyclone 16. It will be appreciated that the filter housing may be mounted under cyclone 16, or under any cyclonic stage, and is preferably positioned downstream from the last cyclonic cleaning stage and upstream from the suction motor 26. The filter housing may be removably mounted to filtration apparatus 10, such as by a screw mount, a bayonet mount, a snap fit connection or the like. Accordingly, if the filter housing is removably mounted, it may be separately emptied or replaced. If the filtration apparatus is removable from the surface cleaning apparatus, then the filter housing may be mounted to the filtration apparatus such that it is removable therewith, or may be retained on the surface cleaning apparatus. Alternately, the filter housing may be openable while mounted to the surface cleaning apparatus.

As exemplified in FIGS. 1-6, vacuum cleaner 10 comprises a hand held vacuum cleaner and the filter housing is provided on a lower surface of the surface cleaning apparatus. The filter housing is preferable mounted so that is may be opened when mounted to the surface cleaning apparatus or a removable filtration apparatus such that when dirt collection area 88 is opened, dirt may fall directly into a garbage can (e.g., no element of the surface cleaning apparatus is positioned below the filter housing to impede the emptying of filter housing.

If surface cleaning apparatus is of an alternate design, e.g., an upright vacuum cleaner, then the filter housing is also preferably provided on a lower surface of the such that the filter housing may be opened and emptied while mounted to the surface cleaning apparatus, or on a lower surface of the removable cyclonic stage or stages.

As exemplified in FIGS. 1-6, vacuum cleaner 10 comprises a hand held vacuum cleaner. Accordingly, vacuum cleaner 10 may be provided with handle 54, which is affixed to lid 32 and lid 58 of second housing 14. Handle 54 may alternately be affixed to any other portion or portions of vacuum cleaner 10 as is known in the art. Optionally, as exemplified, on/off switch 56 may be provided on handle 54. On/off switch 56 may alternately be provided on any other portion of vacuum cleaner 10.

As exemplified in FIG. 3, suction motor 26 is positioned in second housing 14, preferably with a suction fan provided below the electric motor. Clean air outlet 60 is provided downstream from suction motor 26. An optional post-motor filter may be provided downstream from suction motor 26, such as in post-motor filter housing 62, which may be accessible via post motor filter housing door 64, which could be pivotably mounted to second housing 14.

While the use of impingement member 30 is exemplified in a surface cleaning apparatus having side-by-side housings 12, 14, it will be appreciated that this design may be used in any vacuum cleaner configuration. It will also be appreciated that an impingement surface need not be used.

In accordance with a preferred embodiment of this invention, dirt collection chamber 18 surrounds at least a portion of and, as exemplified, preferably all of cyclone 16. Accordingly, cyclone 16 may be positioned in dirt collection chamber 18 and, preferably, generally centrally therein. In accordance with this preferred embodiment, vacuum cleaner 10 is configured such that the dirt collected on floor 44 of cyclone 16 is emptied at the same time as dirt collected on floor 42 of dirt collection chamber 18. Accordingly, floor 42 and floor 44 are both movable and connected to each other whereby both floor 42 and 44 are concurrently movable such that dirt collection chamber 18 and cyclone 16 are concurrently emptied. In an alternate embodiment, dirt collection chamber 18 may be provided in the bottom of cyclone 16.

Figure 5:
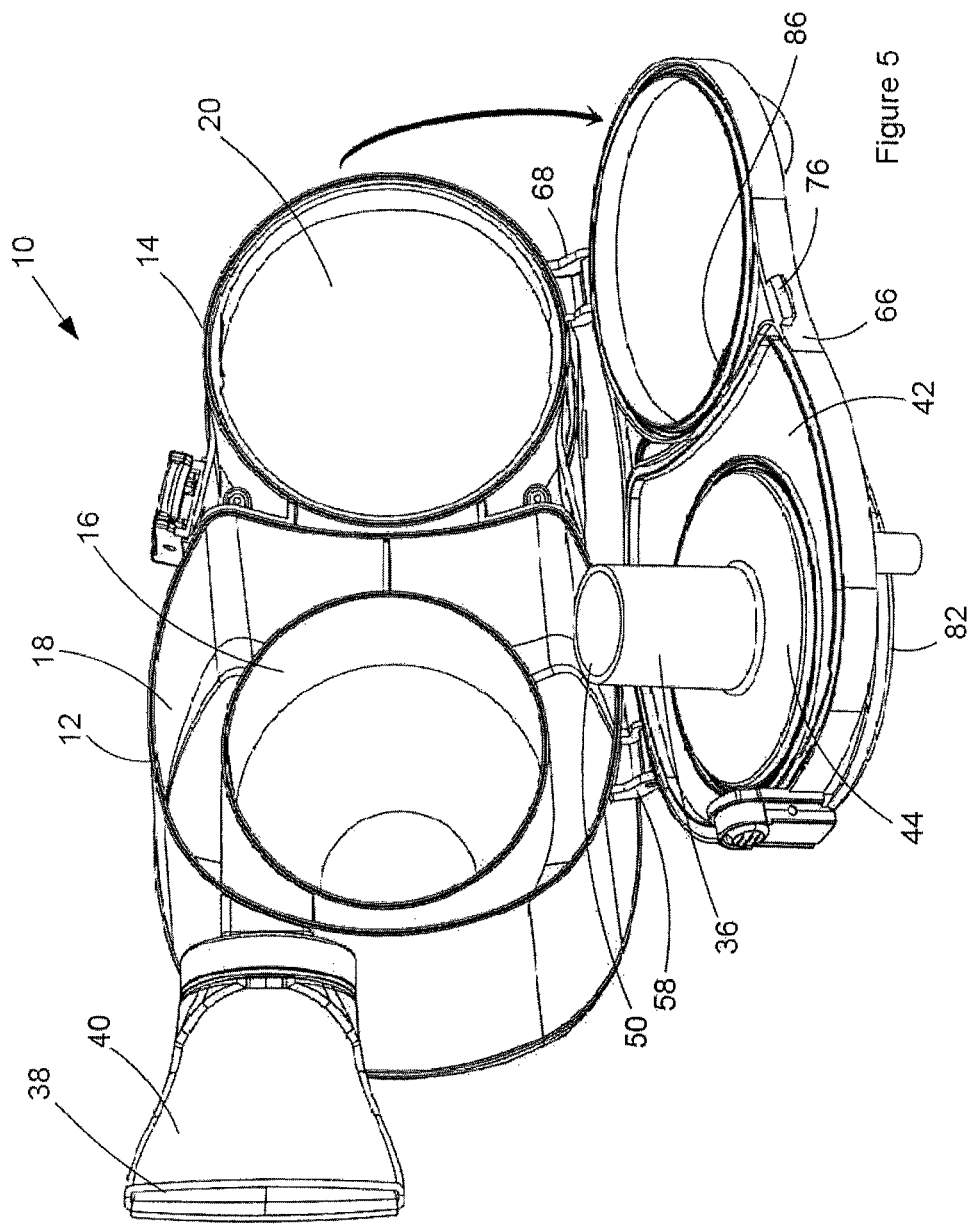
FIG. 5 is a perspective view from the bottom of the vacuum cleaner of FIG. 1 wherein the bottom of the first and second housings is open; and, FIG. 6 is a perspective view of the bottom of the vacuum cleaner of FIG. 1 wherein the first and second housings are closed but an access door is open.

As exemplified in FIG. 5, floors 42 and 44 may comprise a pivoting bottom of first housing 12 and, alternately, of the filtration apparatus (e.g. housings 12 and 14 of this embodiment). Accordingly, as seen in FIG. 5, when floors 42 and 44 are opened, cyclone 16, dirt collection chamber 18 and dirt collection area 88 may be emptied by holding vacuum cleaner 10 in the upright position (as shown in FIG. 1). Accordingly, the dirt will fall out of cyclone 16, dirt collection chamber 18 and dirt collection area 88 and will fall downwardly off of floors 42 and 44.

As shown in FIG. 5, housings 12 and 14 have a pivoting bottom 66, which is secured to each of housings 12 and 14 by a pivot 68. In the closed position exemplified in FIGS. 1 and 4, pivoting bottom 66 is secured in position by latch 70. Latch 70 has a button 72 which, when pressed, causes arm 74 to move outwardly thereby disengaging a flange provided on the bottom end of arm 74 from flange 76 provided on pivoting bottom 66. A gasket or other sealing member may be provided at the interface of housings 12 and 14 and pivoting bottom 66 to provide an air tight or fluid tight seal. It will be appreciated that bottom 66 may be moveable in any other direction by any other means known in the art and may optionally be removable from housings 12, 14. Further, bottom 66 may be moveably secured in position by any other means known in the art and need not be connected to surface cleaning apparatus 10 for relative motion thereto.

As exemplified in FIG. 5, outlet 36 is provided as part of floor 42, and is preferably integrally molded therewith. In an alternate embodiment, it will be appreciated that outlet 36 need not be removable from cyclone 16 with floor 42.

It will be appreciated that dirt collection area 88 may alternately be independently openable or openable with one or both of cyclone 16 and dirt collection chamber 18. For example, the bottom of housing 14 need not be contiguous with floors 42 and 44. Each may be pivotally mounted to their respective housing. In such an embodiment, foam filter 20 may remain sealed when cyclone 16 and dirt collection chamber 18 are emptied. In an alternate embodiment, a side-by-side housing design as exemplified in FIG. 1 need not be utilized.

As exemplified, optional screen 78 may be provided in an openable filtration chamber 80. As exemplified, filtration chamber 80 is provided as part of the lower surface of cyclone 16. It will be appreciated that it is preferred that filtration chamber 80 is positioned adjacent air outlet 36 of cyclone 16, or downstream of the first cyclonic stage if a plurality of cyclonic stages are provided.

As exemplified, filtration chamber 80 is openable independently of any other member, e.g., cyclone 16, dirt collection chamber 18 and the chamber housing foam filter 20. Also, as exemplified, the lower surface of filtration chamber 80 is openable. However, it will be appreciated that an alternate wall or portion of filtration chamber 80 may be openable and that filtration chamber 80 may be at alternate locations on a surface cleaning apparatus that is downstream from the first cyclonic cleaning stage.

Preferably, screen 78 comprises a screen, such as an open mesh screen, e.g., a wire mesh screen or, alternatively, a plastic mesh screen. It may be flat or curved, e.g. bowl shaped, so as to increase the surface area of the screen.

As exemplified, the openable portion of filtration chamber 80 comprises access door 82. When opened, access door 82 permits access to screen 78 such that screen 78 may be cleaned. Access door 82 may be any door that is movably mounted in overlying relationship to filtration chamber 80. It will also be appreciated that if filtration chamber 80 is removably mounted to surface cleaning apparatus 10, it may be opened as it is removed from surface cleaning apparatus 10. For example, the side of filtration chamber 80 that abuts surface cleaning apparatus 10 may be closed by a wall of surface cleaning apparatus 10 to which filtration chamber 80 is attached.

Figure 6:
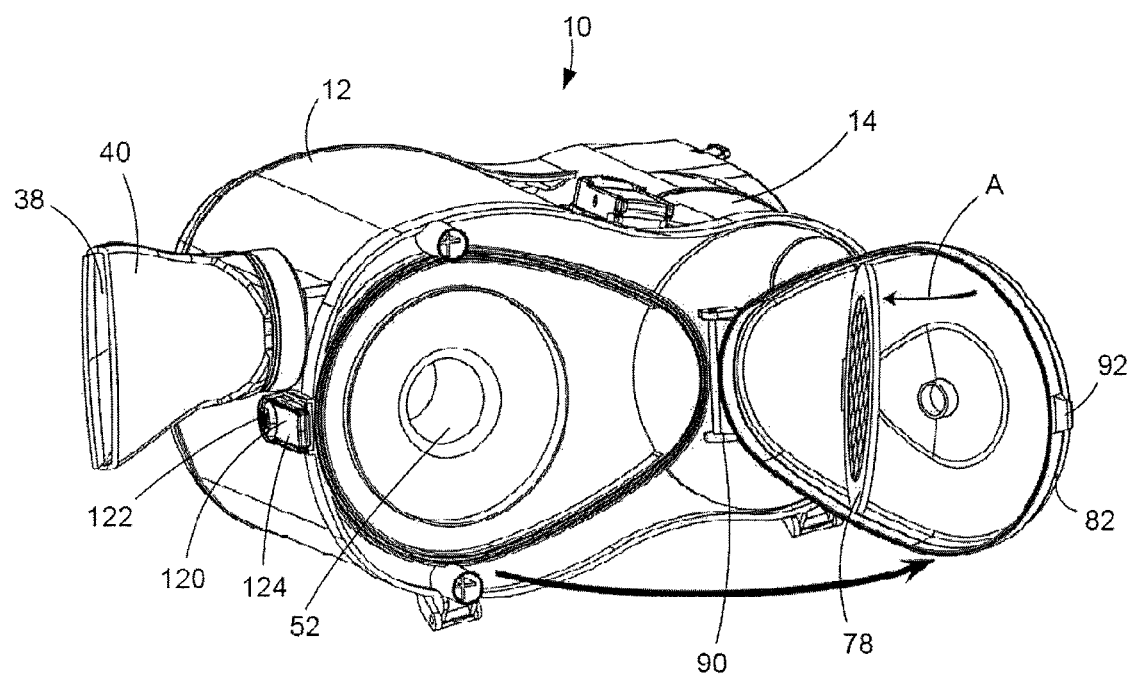

As exemplified in FIG. 6, access door 82 may be pivotally mounted by pivot 90 to pivoting bottom 66, and is secured in position by a latch 120. Latch 120, for example, may have a button 122 which, when pressed, causes arm 124 to move outwardly thereby disengaging a flange on the bottom end of arm 124 from flange 92 provided on the front end of access door 82. A sealing gasket or other sealing member known in the art may be utilized to provide an air tight or fluid tight seal for filtration chamber 80. Any other securing member known in the art may be used. Further door 82 may be removable and need not be connected to surface cleaning apparatus 10 for relative motion thereto.

Preferably, screen 78 is mounted and, more preferably, movably mounted and, most preferably, removably mounted to access door 82. As shown in FIG. 6, screen 78 is pivotally mounted to the inner surface of access door 82. Accordingly, when a user desires to clean screen 78, it may be pivoted in the direction shown by arrow A in FIG. 6 to an open or cleaning position. It will be noticed that access door 82 may be opened independently of pivoting bottom 66.

Preferably, at least a portion of and, more preferably, all of access door 82 is transparent. Accordingly, a user may lift the vacuum cleaner, invert the vacuum cleaner or tilt the vacuum cleaner on its side to view screen 78 and determine whether filtration 78 requires cleaning or, alternately, replacement. It will be appreciated that another part of filtration chamber 80, preferably all of filtration chamber 80, may be transparent.

It will also be appreciated that any of the aforementioned embodiments may be used singly or in any particular combination or sub-combination of the remaining features listed above.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A surface cleaning apparatus comprising:
   (a) a dirty air inlet;
   (b) a filtration apparatus comprising at least one cyclone and at least one filter mounted in a filter housing;
   (c) the filter housing having a lower portion that is openable while secured to the surface cleaning apparatus and the filter is visible when the lower portion is opened, the filter has an upstream filter surface that faces the openable lower portion and is spaced therefrom, whereby a dirt collection area is provided between the upstream filter surface and the openable lower portion;
   (d) a suction motor; and,
   (e) a clean air outlet downstream from the suction motor.

2. The surface cleaning apparatus of claim 1 wherein the filter housing is openable while the filter housing is mounted to the filtration apparatus.

3. The surface cleaning apparatus of claim 1 further comprising an openable cyclone dirt collection chamber and the filter housing is openable independently of the cyclone dirt collection chamber.

4. The surface cleaning apparatus of claim 1 further comprising an openable cyclone dirt collection chamber and the filter housing is openable concurrently with the cyclone dirt collection chamber.

5. The surface cleaning apparatus of claim 1wherein the filter housing is mounted to the at least one cyclone.

6. The surface cleaning apparatus of claim 1 wherein the filter housing is removably mounted to the filtration apparatus.

7. The surface cleaning apparatus of claim 1 wherein the filter housing is positioned below the cyclone.

8. The surface cleaning apparatus of claim 1 wherein the filter housing is positioned adjacent the cyclone.

9. The surface cleaning apparatus of claim 1 wherein the cyclone is openable and the filter housing is openable concurrently with the cyclone.

10. A surface cleaning apparatus comprising:
    (a) a dirty air inlet;
    (b) a filtration apparatus comprising at least one cyclone and at least one filter mounted in a filter housing;
    (c) the filter housing having a lower portion that is openable while secured to the surface cleaning apparatus and the filter is visible when the lower portion is opened;
    (d) first and second housings positioned side by side, the first housing comprising the at least one cyclone and the second housing comprising the filter housing, the first housing has a first housing bottom that is openable and the openable lower portion comprises the bottom of the second housing and wherein the first housing bottom is connected to the second housing bottom, whereby both the first housing bottom and the second housing bottom are moveable concurrently;
    (e) a suction motor; and,
    (f) a clean air outlet downstream from the suction motor.

11. The surface cleaning apparatus of claim 10 wherein the first housing further comprises a dirt collection chamber positioned around at least a portion of the cyclone, the dirt collection chamber has a moveable dirt collection chamber floor, the cyclone has a lower moveable cyclone floor, whereby both the dirt collection chamber and the cyclone are concurrently emptied when the first housing bottom and the second housing bottom are opened concurrently.

12. The surface cleaning apparatus of claim 11 further comprises a dirt collection chamber positioned around at least a portion of the cyclone and the cyclone floor includes a vortex finder mounted thereto.

13. A surface cleaning apparatus comprising:
    (a) a dirty air inlet;
    (b) a filtration apparatus comprising at least one cyclone and at least one filter mounted in a filter housing;
    (c) the filter housing having a lower portion that is openable while secured to the surface cleaning apparatus and the filter is visible when the lower portion is opened;
    (d) first and second housings positioned side by side, the first housing comprising the at least one cyclone and the second housing comprising the filter housing, the first housing has a first housing bottom and the second housing has a second housing bottom and the first housing bottom and the second housing bottom form part of an airflow passage from a cyclone outlet to an upstream side of the filter;
    (e) a suction motor; and,
    (f) a clean air outlet downstream from the suction motor.

14. The surface cleaning apparatus of claim 13 wherein at least a portion of the airflow passage is transparent.

15. A surface cleaning apparatus comprising:
    (a) a dirty air inlet;
    (b) a filtration apparatus comprising at least one cyclone and at least one filter mounted in a filter housing;
    (c) the filter housing having a portion that is openable while secured to the surface cleaning apparatus and the filter is visible when the portion is opened;
    (d) a mechanical filter-cleaning member connected to the filter wherein the mechanical filter-cleaning member is actuated when the openable portion of the filter housing is opened;
    (e) a suction motor; and,
    (f) a clean air outlet downstream from the suction motor.

16. The surface cleaning apparatus of claim 15 wherein the mechanical filter-cleaning member comprises a vibrator connected to the filter.

17. The surface cleaning apparatus of claim 15 wherein the mechanical filter-cleaning member comprises a wiper positioned on an upstream side of the filter.

18. The surface cleaning apparatus of claim 15 wherein the mechanical filter-cleaning member is battery powered.

19. A surface cleaning apparatus comprising:
(a) a dirty air inlet;
(b) a filtration apparatus comprising at least one cyclone and at least one filter mounted in a filter housing;
(c) the filter housing having a portion that is openable while secured to the surface cleaning apparatus and the filter is visible when the lower portion is opened, the filter has an upstream filter surface that faces a dirt collection surface and is spaced therefrom, whereby a dirt collection area is provided between the upstream filter surface and the dirt collection surface;
(d) a suction motor; and,
(e) a clean air outlet downstream from the suction motor.

\* \* \* \* \*